United States Patent
Sakamoto et al.

(10) Patent No.: US 10,590,286 B2
(45) Date of Patent: Mar. 17, 2020

(54) ROOM-TEMPERATURE-CURABLE ORGANOPOLYSILOXANE COMPOSITION, AND BASE MEMBER COATED WITH CURED OBJECT OBTAINED FROM SAID COMPOSITION

(71) Applicant: Shin-Etsu Chemical Co., Ltd., Tokyo (JP)

(72) Inventors: Takafumi Sakamoto, Annaka (JP); Akitsugu Fujiwara, Annaka (JP); Takahiro Yamaguchi, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 16/092,708

(22) PCT Filed: Apr. 6, 2017

(86) PCT No.: PCT/JP2017/014339
§ 371 (c)(1),
(2) Date: Oct. 10, 2018

(87) PCT Pub. No.: WO2017/195508
PCT Pub. Date: Nov. 16, 2017

(65) Prior Publication Data
US 2019/0127593 A1 May 2, 2019

(30) Foreign Application Priority Data
May 9, 2016 (JP) .................................. 2016-093587

(51) Int. Cl.
| C09D 5/16 | (2006.01) |
| C09D 183/06 | (2006.01) |
| C08L 83/06 | (2006.01) |
| C08K 5/5425 | (2006.01) |
| C08K 5/5415 | (2006.01) |
| C09D 183/14 | (2006.01) |

(52) U.S. Cl.
CPC .......... *C09D 5/1675* (2013.01); *C08K 5/5415* (2013.01); *C08K 5/5425* (2013.01); *C08L 83/06* (2013.01); *C09D 183/06* (2013.01); *C09D 183/14* (2013.01)

(58) Field of Classification Search
CPC .............................. C08L 83/06; C09D 186/06
See application file for complete search history.

(56) References Cited

U.S. PATENT DOCUMENTS

| 5,218,059 A | 6/1993 | Kishihara et al. |
| 2017/0130031 A1 | 5/2017 | Yamaguchi et al. |
| 2017/0306099 A1 | 10/2017 | Yamaguchi et al. |
| 2017/0342216 A1* | 11/2017 | Sixt ........................ C08G 77/26 |
| 2018/0079867 A1 | 3/2018 | Yamaguchi et al. |

FOREIGN PATENT DOCUMENTS

| JP | 54-88224 A | 7/1979 |
| JP | 54-88225 A | 7/1979 |
| JP | 58-13673 A | 1/1983 |
| JP | 62-84166 A | 4/1987 |
| JP | 2503986 B2 | 6/1996 |
| JP | 2952375 B2 | 9/1999 |
| WO | WO 2015/093139 A1 | 6/2015 |
| WO | WO 2015/194340 A1 | 12/2015 |
| WO | WO 2016/157948 A1 | 10/2016 |

OTHER PUBLICATIONS abstract for CN 6215710 (Dec. 2016).*
International Search Report (PCT/ISA/210) issued in PCT/JP2017/014339, dated Jul. 11, 2017.
Written Opinion (PCT/ISA/237) issued in PCT/JP2017/014339, dated Jul. 11, 2017.
Extended European Search Report dated Nov. 22, 2019, in European Patent Application No. 17795869.1.
Office Action dated Nov. 19, 2019, in Japanese Patent Application No. 2018-516897.

* cited by examiner

*Primary Examiner* — Marc S Zimmer
(74) *Attorney, Agent, or Firm* — Birch, Stewart, Kolasch & Birch, LLP

(57) ABSTRACT

Provided is a room temperature-curable organopolysiloxane composition for preventing aquatic organisms from adhering to and growing on an underwater structure. The composition comprises:
(A) an organopolysiloxane represented by the following general formula (1)

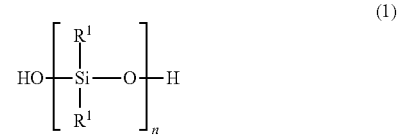

wherein $R^1$ represents either a hydrogen atom or a monovalent hydrocarbon group that may have a substituent group, and n represents an integer of not smaller than 1;
(B) a hydrolyzable organosilicon compound and/or a partial hydrolysis condensate thereof, represented by the following general formula (2)

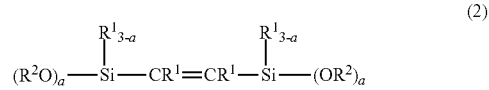

wherein $R^1$ represents either a hydrogen atom or a monovalent hydrocarbon group that may have a substituent group, $R^2$ represents either an alkyl group that may have a substituent group or a cycloalkyl group, and a represents an integer of 1 to 3;
(C) a curing catalyst; and
(G) a bleed oil.

6 Claims, No Drawings

ROOM-TEMPERATURE-CURABLE ORGANOPOLYSILOXANE COMPOSITION, AND BASE MEMBER COATED WITH CURED OBJECT OBTAINED FROM SAID COMPOSITION

TECHNICAL FIELD

The present invention relates to a room temperature-curable organopolysiloxane composition suitable for use in a coating material for a base member such as an underwater structure; and a base member coated with a cured product of such composition.

BACKGROUND ART

Conventionally, there are brown various room temperature-curable silicone rubber compositions capable of forming rubbery elastic bodies at room temperature. A cured rubber obtained from a room temperature-curable silicone rubber composition (referred to as RTV silicone rubber composition hereunder) is superior to other organic rubbers in, for example, weather resistance, durability, heat resistance and cold resistance, and is thus used in various fields. Especially, in the field of architecture, such cured rubber is frequently used as, for example, a seal for bonding glasses; metals and glasses; and concrete joints. Further, in recent years, the cured rubber has also been widely used as a coating material for, for example, buildings, plants, and inner and outer surfaces of water pipes.

Meanwhile, once an underwater structure has been installed or in service aquatic organisms such as barnacles, sea squirts, serpulas, mussels, freshwater mussels, bryozoans, green lavers and sea lettuce that live underwater in, for example, seas and rivers will adhere to and grow on the surface of the underwater structure, ranging from a part exposed to droplets to a part underwater, which will then result in various damages. For example, when a living organism(s) has adhered to a vessel hull, the friction resistance between the bull and water will increase such that the navigation speed will drop, and that the fuel consumption will thus rise in order to maintain a constant speed, which leads to an economic disadvantage. Further, when a living organism(s) has adhered to a structure that is fixed underwater or to water surface e.g. a harbor facility, it will be difficult for such structure to fully display its unique functions, and a base member(s) thereof may be eroded as well. Furthermore, when a living organism(s) has adhered to, for example, a culturing net or a fixed net, the meshes thereof may be clogged such that fishes may die.

As a countermeasure for preventing aquatic organisms from adhering to and growing on underwater structures, there has been applied to these structures an antifouling paint prepared by combining toxic antifouling agents such as an organotin compound and cuprous oxide. Although the adhesion/growth of aquatic organisms can thus be substantially prevented by such paint, it is not preferable in terms of environmental safety and health when producing the paint and then using it to perform coating, because the paint employs toxic antifouling agents. Moreover, the usage of this paint has been legally banned due to the fact that the toxic antifouling agents gradually dissolve out of the coating film underwater, and may thus pollute waters in the long run.

Here, as a paint that has the effect of preventing the adhesion: growth of aquatic organisms, but does not contain a toxic antifouling agent(s), there has been proposed a non-toxic antifouling paint (JP-A-Sho-58-13673: Patent document 1, JP-A-Sho-62-84166: Patent document 2) that is produced by combining an RTV silicone lubber composition with a liquid paraffin or petrolatum, and is capable of imparting an antifouling, property by reducing the surface tension of the coating film. Further, there has also been proposed a non-toxic antifouling paint composition (Japanese Patent No. 2503986: Patent document 3, Japanese Patent No. 2952375: Patent document 4) capable of exhibiting an antifouling property as follows. That is, when volume contraction occurs as a reaction-curable silicone resin cures, a non-reactive polar group-containing silicone resin poor in compatibility will ooze out on the surface, coupled with the fact that the reaction-curable silicone resin itself has a low surface tension. However, the above non-toxic antifouling paint composition has environmental safety and health issues, because the non-reactive polar group-containing silicone resin poor in compatibility causes oil bleed involving a silicone resin having a polyoxyethylene group in which ethylene oxide, propylene oxide or the like has been added to a Si atom via a C—C bond; or a silicone resin with an alkoxy group being introduced to a Si atone via ethylene oxide or propylene oxide, at its molecular chain end.

PRIOR ART DOCUMENT

Patent Document

Patent document 1: JP-A-Sho-58-13673
Patent document 2: JP-A-Sho-62-84166
Patent document 3: Japanese Patent No. 2503986
Patent document 4: Japanese Patent No. 2952375

SUMMARY OF THE INVENTION

Problem to be Solved by the Invention

Therefore, it is an object of the present invention to provide a room temperature-curable organopolysiloxane composition that is free of an organotin compound regarded as problematic in terms of environmental safety and health, but has an excellent curability, and can form a cured coating film having a superior rubber strength and surface smoothness, and exhibiting an excellent antifouling property for a long period of time; and a base member coated with a cured product of this composition.

Means to Solve the Problem

The inventors of the present invention diligently conducted a series of studies to achieve the above objectives, and completed the invention as follows. That is, the inventors found that only when a linking group adjacent to an alkoxysilyl group was a vinylene group (ethenylene group), the hydrolyzability of the alkoxy group in this alkoxysilyl group would dramatically improve. Specifically, the inventors found that a dealcoholization-type room temperature-curable organopolysiloxane composition superior in fast curability and capable of forming a cured product with an excellent storage stability could be obtained by employing, as a cross-linking agent (curing agent), a hydrolyzable organosilicon compound such as a bissilyl-type organosilane characterized by having, in one molecule, two hydrolyzable silyl groups and a structure in which the two silicon atoms in these hydrolyzable silyl groups are bonded together by a carbon-carbon double bond (ethenylene group); and/or a partial hydrolysis condensate thereof (a hydrolyzable siloxane oligomer), as represented by the following formula (2). In addition, the inventors also found that by adding a particular bleed oil, the cured coating film obtained will be superior in rubber strength and surface smoothness, and exhibit an antifouling property for a long period of time.

Thus, the present invention is to provide the following room temperature-curable organopolysiloxane composition; and a base member coated with a cured product of such composition.

[1]

A room temperature-curable organopolysiloxane composition containing:

(A) 100 parts by mass of an organopolysiloxane represented by the following general formula (1)

[Chemical formula 1]

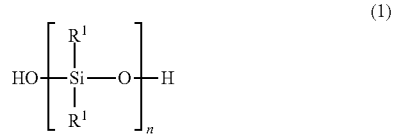
(1)

wherein R$^1$ represents either a hydrogen atom or a monovalent hydrocarbon group that may haw a substituent group and has 1 to 20 carbon atoms, R$^1$s may be identical to or different from one another, and n represents an integer of not smaller than 1;

(B) 0.1 to 30 parts by mass of a hydrolyzable organosilicon compound and/or a partial hydrolysis condensate thereof, represented by the following general formula (2)

[Chemical formula 2]

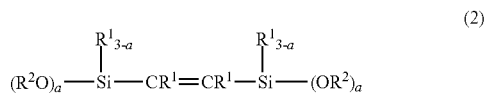
(2)

wherein R$^1$ represents either a hydrogen atom or a monovalent hydrocarbon group that may have a substituent group and has 1 to 20 carbon atoms, R$^1$s may be identical to or different from one another, R$^2$ represents either an alkyl group that may have a substituent group and has 1 to 20 carbon atoms or a cycloalkyl group that may have a substituent group and has 3 to 20 carbon atoms, and a represents an integer of 1 to 3;

(C) 0.001 to 20 parts by mass of a curing catalyst; and
(G) 0.01 to 100 parts by mass of a bleed oil.

[2]

The room temperature-curable organopolysiloxane composition according to further containing at least one of (D) 0.1 to 30 parts by mass of a hydrolyzable organosilane and/or a partial hydrolysis condensate thereof other than the components (A) and (B);

(E) 0.5 to 1,000 parts by mass of a filler; and
(F) 0.1 to 30 parts by mass of an adhesion accelerator.

[3]

A base member coated with a cured product of the room temperature-curable organopolysiloxane composition as set forth in [1] or [2].

[4]

The base member according to [3], wherein the base member is an underwater structure.

Effects of the Invention

The room temperature-curable organopolysiloxane composition of the present invention does not contain a tin compound that is useful as a curing catalyst, but has environmental safety and health problems. Even so, the composition of the invention has an excellent curability, and a cured coating film obtained therewith is superior in rubber strength, surface smoothness, coating film strength and coating film hardness. Also, if used as an antifouling paint, the coating film can exhibit an excellent antifouling property for a long period of time. Particularly, when painted on an underwater structure, aquatic organisms can be favorably prevented from adhering to and growing on the surface of such underwater structure, and the persistence of this effect is favorable as well.

That is, the coating film obtained with the room temperature-curable organopolysiloxane composition of the invention is not toxic. When such coating film has been applied to an underwater structure, an excellent antifouling property will be exhibited as the adhesion/growth of aquatic organisms can be prevented for a long period of time. In this way, the composition of the invention is highly suitable for use in, for example, coating materials requiring a water resistance, such as a ship bottom paint, a paint for seawater pipes at power plants and a paint for fish net; moistureproof coating materials requiring a moisture resistance, such as LCD and PDP; and adhesive seals such as an adhesive seal used between electric wires and resin coating, an adhesive seal used between electric wires and a resin case or connector, and an adhesive seal for compression or decompression chambers. Especially, when used as, for example, a ship bottom paint, a paint for seawater pipes at power plants and a paint for fish net, the composition is useful in preventing aquatic organisms from adhering to and growing on the surfaces of these objects.

Further, the composition will especially exhibit an excellent fast curability, if using, as a curing agent component (B), a hydrolyzable organosilicon compound such as a bissilyl-type organosilane characterized by having, in one molecule, two hydrolyzable silyl groups and a structure in which the two silicon atoms in these hydrolyzable silyl groups are bonded together by a carbon-carbon double bond (ethenylene group); and/or a partial hydrolysis condensate thereof (a hydrolyzable siloxane oligomer), as represented by the above general formula (2). In addition, by employing such component (B), the composition can form a cured product with a favorable storage stability and durability. The room temperature-curable organopolysiloxane composition of the invention can be produced in an industrially advantages manner, by employing, as a starting raw material of the component (B), vinylsilane (e.g. monovinyl alkoxysilane) which is a general-purpose product.

MODE FOR CARRYING OUT THE INVENTION

The present invention is described in greater detail hereunder.

Room Temperature-Curable Organopolysiloxane Composition

—Component (A)—

A component (A) is a linear organopolysiloxane represented by the following general formula (1). The component (A) is a linear organopolysiloxane with both of its molecular chain ends being blocked by a hydroxyl group bonded to a silicon atom (i.e. silanol group or diorganohydroxysiloxy group), and series as a main agent (base polymer) the composition of the present invention.

[Chemical formula 3]

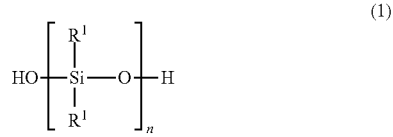

(In the formula (1), $R^1$ represents a hydrogen atom, or a monovalent hydrocarbon group that may have a substituent group and has 1 to 20 carbon atoms. The $R^1$s may be identical to or different from one another, n represents an integer of not smaller than 1.)

In the above formula (1), the substituted or unsubstituted monovalent hydrocarbon group represented by $R^1$ has about 1 to 20, preferably 1 to 10, more preferably 1 to 8 carbon atoms. The $R^1$s may be identical to or different from one another. Specific examples of such monovalent hydrocarbon group include alkyl groups such as a methyl group, an ethyl group, n-propyl group, an isopropyl group, n-butyl group, an isobutyl group, a tert-butyl group, a pentyl group, a neopentyl group, a hexyl group, a heptyl group, an octyl group, 2-ethylhexyl group, a nonyl group, a decyl group, an undecyl group, a dodecyl group, a tridecyl group, a tetradecyl group, a pentadecyl group, a hexadecyl group, a heptadecyl group, an octadecyl group, a nonadecyl group and an eicosyl group; cycloalkyl groups such as a cyclopentyl group and a cyclohexyl group; alkenyl groups such as a vinyl group, an allyl group, a propenyl group, an isopropenyl group, a butenyl group, a pentenyl group and a hexenyl group; aryl groups such as a phenyl group, a tolyl group, a xylyl group and α-, β-naphthyl group; aralkyl groups such as a benzyl group, 2-phenylethyl group and 3-phenylpropyl group; or groups obtained by substituting a part of or all the hydrogen atoms in any of these groups with, for example, a cyano group and/or halogen atoms such as F, Cl and Br, the examples of such substituted groups including 3-chloropropyl group, 3,3,3-trifluoropropyl group and 2-cyanoethyl group. Among the above groups, a methyl group, an ethyl group and a phenyl group are preferred, where a methyl group and a phenyl group are particularly preferred in terms of availability, productivity and cost.

Further, it is preferred that the viscosity of the organopolysiloxane as the component (A) at 25° C. be 10 to 1,000,000 mPa·s, more preferably 50 to 500,000 mPa·s, even more preferably 100 to 100,000 mPa·s, and particularly preferably 500 to 80,000 mPa·s. It is preferable if such viscosity of the organopolysiloxane is not lower than 10 mPa·s, and not higher than 1,000,000 mPa·s. Because when this viscosity is not lower than 10 mPa·s, a coating film superior in physical and mechanical strength can be easily obtained; and when this viscosity is not higher than 1,000,000 mPa·s the composition will not exhibit an excessively high viscosity such that a favorable workability can be achieved at the time of use. Here, viscosity refers to a numerical value measured by a rotary viscometer (e.g. BL type, BH type, BS type, cone plate type and rheometer, the same shall apply hereinafter).

Here, in order for the organopolysiloxane as the component (A) to exhibit the above viscosity, it is desired that the value of "n" in the general formula (1) (number of bifunctional diorganosiloxane units in one molecule or polymerization degree) be an integer of about 10 to 2,000 under normal conditions, preferably an integer of about 30 to 1,500, more preferably an integer of about 50 to 1,200, and even more preferably an integer of about 100 to 1,000. Particularly, the polymerization degree (or molecular weight) can, for example, be obtained as a number average polymerization degree (or number average molecular weight) in terms of polystyrene in a gel permeation chromatography (GPC) analysis that employs toluene or the like as a developing solvent.

One kind; or two or more kinds of the organopolysiloxane as the component (A) may, be used in combination.

It is preferred that the organopolysiloxane as the component (A) be contained in the room temperature-curable organopolysiloxane composition of the invention by an amount of 25 to 98% by mass, particularly preferably 60 to 90% by mass.

—Component (B)—

A component (B), as represented by the following general formula (2), comprises a hydrolyzable organosilicon compound such as a bissilyl-type organosilane characterized by having, in one molecule, two hydrolyzable silyl groups and a structure in which the two silicon atoms in these hydrolyzable silyl groups are bonded together by a carbon-carbon double bond (ethenylene group); and/or a partial hydrolysis condensate thereof (i.e. a hydrolyzable siloxane oligomer that is obtained by partially hydrolyzing the aforementioned hydrolyzable organosilicon compound, and has at least two, preferably not less than three hydrolyzable groups remaining in one molecule). The component (B) serves as a curing agent (cross-linking agent) in the composition of the invention, contributes to a fast curability of such composition, and imparts a superior moisture resistance to a cured product (silicone rubber) obtained.

[Chemical formula 4]

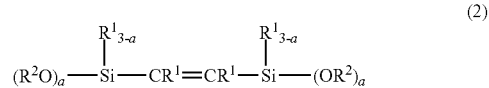

(In the formula (2), $R^1$ represents a hydrogen atom, or a monovalent hydrocarbon group that may have a substituent group and has 1 to 20 carbon atoms. The $R^1$s may be identical to or different from one another. $R^2$ represents an alkyl group that may have a substituent group and has 1 to 20 carbon atoms; or a cycloalkyl group that may have a substituent group and has 3 to 20 carbon atoms, a represents an integer of 1 to 3.)

Here, in the above general formula (2), the substituted or unsubstituted monovalent hydrocarbon group represented by $R^1$ has about 1 to 20, preferably 1 to 10, more preferably 1 to 8 carbon atoms. The $R^1$s may be identical to or different from one another. Specific examples of such monovalent hydrocarbon group include alkyl groups such as a methyl group, an ethyl group, n-propyl group, an isopropyl group, n-butyl group, an isobutyl group, a tert-butyl group, a pentyl group, a neopentyl group, a hexyl group, a heptyl group, an octyl group, 2-ethylhexyl group, a nonyl group, a decyl group, an undecyl group, a dodecyl group, a tridecyl group, a tetradecyl group, a pentadecyl group, a hexadecyl group, a heptadecyl group, an octadecyl group, a nonadecyl group and an eicosyl group; cycloalkyl groups such as a cyclopentyl group and a cyclohexyl group; alkenyl groups such as a vinyl group, an allyl group, a propenyl group, an isopropenyl group, a butenyl group, a pentenyl group and a hexenyl group; aryl groups such as a phenyl group, a tolyl group, a xylyl group and α-, β-naphthyl group; aralkyl groups such as a benzyl group, 2-phenylethyl group and 3-phenylpropyl group; or groups obtained by substituting a part of or all the hydrogen atoms in any of these groups with, for example, a cyano group and or halogen atoms such as F, Cl and Br, the examples of such substituted groups including 3-chloropropyl group, 3,3,3-trifluoropropyl group and 2-cyanoethyl group. Among the above groups, a methyl group, an ethyl group and a phenyl group are preferred, where a methyl group and a phenyl group are particularly preferred in terms of availability, productivity and cost. Particularly, in the general formula (2), it is preferred that each of the two $R^1$s bonded to the two carbon atoms binding, in the form of a carbon-carbon double bond (ethenylene group), the silicon atoms in the two hydrolyzable silyl groups be a hydrogen atom.

The substituted or unsubstituted alkyl group represented by $R^2$ has about 1 to 20, preferably 1 to 6, more preferably 1 to 4 carbon atoms. The $R^2$s may be identical to or different from one another. Specific examples of such alkyl group include a methyl group, an ethyl group, n-propyl group, an isopropyl group, n-butyl group, isobutyl group, a tert-butyl group, a pentyl group, a neopentyl group, a hexyl group, a heptyl group, an octyl group, 2-ethylhexyl group, a nonyl group, a decyl group, an undecyl group, a dodecyl group, a tridecyl group, a tetradecyl group, a pentadecyl group, a hexadecyl group, a heptadecyl group, an octadecyl group, a nonadecyl group and an eicosyl group. The substituted or unsubstituted cycloalkyl group has about 3 to 20, preferably 4 to 8, more preferably 5 to 6 carbon atoms, examples of which include a cyclopentyl group and a cyclohexyl group. Further, a part of or all the hydrogen atoms in any of these alkyl groups and cycloalkyl groups may be substituted with, for example, a cyano group and/or halogen atoms such as F, Cl and Br, or with a lower alkoxy group having about 1 to 4 carbon atoms. Examples of groups obtained by such substitution include halogen-substituted alkyl groups such as 3-chloropropyl group and 3,3,3-trifluoropropyl group; and alkoxy-substituted alkyl groups such as 2-cyanoethyl group, a methoxymethyl group, a methoxyethyl group, an ethoxymethyl group and an ethoxyethyl group. Among the above examples, it is preferred that $R^2$ be a methyl group an ethyl group or a methoxyethyl group, more preferably a methyl group, in terms of hydrolyzability.

The hydrolyzable organosilicon compound as the component (B) and as represented by the general formula (2), is mainly used as a curing agent (cross-linking agent). In the general formula (2), each "a" independently represents an integer of 1 to 3, preferably 2 or 3 in terms of curability. Especially, those having, in one molecule, three alkoxy groups such as methoxy groups on an identical silicon atom (i.e. six alkoxy groups in total per molecule) are thus regarded as having two trifunctional alkoxysilane moieties in one molecule, thus being useful as a curing agent (cross-linking agent) for a dealcoholization-type silicone RTV (room temperature-curable organopolysiloxane composition). Below are examples for synthesizing the component (B).

Production of Silicon-Containing Compound as Component (B)

The hydrolyzable organosilicon compound as the component (B), such as the bissilyl-type organosilane characterized by having, in one molecule, two hydrolyzable silyl groups and the structure in which the two silicon atoms in these hydrolyzable silyl groups are bonded together by the carbon-carbon double bond (ethylene group), can be easily produced by, for example, an olefin recombination reaction caused by an olefin metathesis reaction of an alkoxysilane having a carbon-carbon double bond such as a vinyl group on a silicon atom. This reaction can, for example, be expressed by the following reaction formula.

[Chemical formula 5]

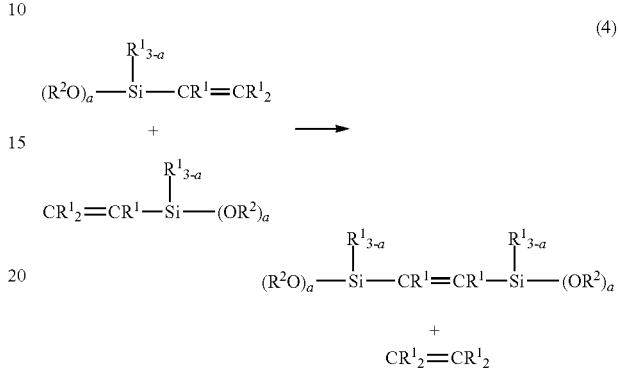

(In the formula (4), $R^1$, $R^2$ and a are as defrayed in the general formula (2).)

As an olefin metathesis catalyst used when performing olefin recombination by the metathesis reaction, there can be listed a ruthenium carbene complex or osmium carbene complex that is formally in an oxidation state of +2, has 16 electrons, and possesses a five-coordinate metal center as shown in the following general formula (5).

[Chemical formula 6]

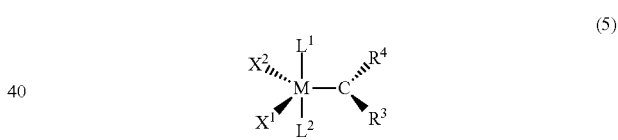

In the formula (5), M represents ruthenium or osmium; $X^1$ and $X^2$ represent any anionic ligands, and may be identical to or different from each other; $L^1$ and $L^2$ represent any neutral electron-donor ligands, and may be identical to or different from each other.

Further, in the formula (5), each of $R^3$ and $R^4$ represents a hydrogen atom; or a group that may have a substituent group, and is selected from an alkyl group having 1 to 20 carbon atoms, an alkenyl group having 2 to 20 carbon atoms, an alkynyl group having 2 to 20 carbon atoms, an aryl group having 2 to 20 carbon atoms, a carboxylate group having 2 to 20 carbon atoms, an alkoxy group having 1 to 20 carbon atoms, an alkenyloxy group having 2 to 20 carbon atoms, an alkynyloxy group having 2 to 20 carbon atoms, an aryloxy group having 2 to 20 carbon atoms, an alkoxycarbonyl group having 2 to 20 carbon atoms, an alkylthio group having 1 to 20 carbon atoms, an alkylsulfonyl group having 1 to 20 carbon atoms, and an alkylsulfinyl group having 1 to 20 carbon atoms.

As a substituent group that may be contained in the group represented by $R^3$ or $R^4$, there can be listed at least one substituent group selected from an alkyl group having 1 to 10 carbon atoms, an alkoxy group having 1 to 10 carbon atoms, and an aryl group. In addition, these substituent groups may also be substituted with at least one selected from a halogen atom(s), an alkyl group having 1 to 5 carbon atoms, an alkoxy group having 1 to 5 carbon atoms, and a phenyl group.

Further, any of the catalyst ligands may have one or more functional groups. Examples of such functional groups that are regarded as appropriate include, but are not limited to a hydroxyl group, thiol, thioether, ketone, aldehyde, ester, ether, amine, imine, amide, nitro, carboxylic acid, disulfide, carbonate, isocyanate, carbodiimide, carboalkoxy, carbamate and halogens.

A preferable example of the above catalyst is such that $R^3$ represents a hydrogen atom, and $R^4$ has a group(s) selected from an alkyl group having 1 to 20 carbon atoms, an alkenyl group having 2 to 20 carbon atoms, and an aryl group; a more preferable example is such that $R^4$ has a phenyl or vinyl group arbitrarily substituted with at least one group selected from an alkyl group having 1 to 5 carbon atoms, an alkoxy group having 1 to 5 carbon atoms, a phenyl group and a functional group. A particularly preferable example is such that $R^4$ has a phenyl or vinyl group substituted with at least one selected from a chlorine atom, a bromine atom, an iodine atom, a fluorine atom, a nitro group, an amino group, a methyl group, a methoxy group and a phenyl group. The most preferable example is such that $R^4$ has a phenyl group.

In the general formula (5), $L^1$ and $L^2$ may be identical to or different from each other, and are selected from phosphine sulfonated phosphine, phosphite, phosphinite, phosphonite, arsine, stibine, ether, amine, amide, imine, sulfoxide, carboxyl, nitrosyl, pyridine and thioether. It is more preferred that each of $L^1$ and $L^2$ represent a phosphine expressed by a structural formula $PR^6R^7R^8$. In this formula, each of $R^6$, $R^7$ and $R^8$ independently represents an aryl group or an alkyl group having 1 to 10 carbon atoms, particularly preferably a primary alkyl group, a secondary alkyl group or a cycloalkyl group. Most preferably, each of the $L^1$ and $L^2$ ligands is selected from $—P(cyclohexyl)_3$, $—P(cyclopentyl)_3$, $—P(isopropyl)_3$ and $—P(phenyl)_3$.

Other favorable examples of these catalysts are such that $L^1$ represents any neutral electron-donor, and $L^2$ represents an imidazolidine ligand. For example, $L^2$ may be that represented by the following structural formula (6).

[Chemical formula 7]

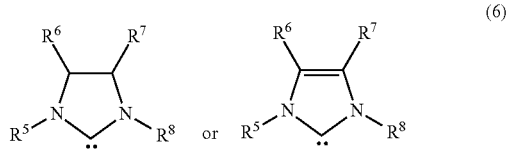

(6)

In the above formula (6), each of $R^5$, $R^6$, $R^7$ and $R^8$ independently represents a hydrogen atom; or a group that may have a substituent group and is selected from an alkyl group having 1 to 20 carbon atoms, an alkenyl group having 2 to 20 carbon atoms, an alkynyl group having 2 to 20 carbon atoms, an aryl group having 2 to 20 carbon atoms, a carboxylate group having 2 to 20 carbon atoms, an alkoxy group having 1 to 20 carbon atoms, an alkenyloxy group having, 2 to 20 carbon atoms, an alkynyloxy group having 2 to 20 carbon atoms, an aryloxy group having 2 to 20 carbon atoms, an alkoxycarbonyl group having 2 to 20 carbon atoms, an alkylthio group having 1 to 20 carbon atoms, an alkylsulfonyl group having 1 to 20 carbon atoms, and an alkylsulfinyl group having 1 to 20 carbon atoms.

Further, $R^6$ and $R^7$ are either bound together at a terminal moiety to, form a cycloalkyl ring structure or an aromatic ring structure; or are unsubstituted. Furthermore, both $L^1$ and $L^2$ may be bidentate ligands.

Among the above catalysts, preferable examples are such that each of $X^1$ and $X^2$ independently represents a hydrogen atom, a halogen atom, an alkyl group having 1 to 20 carbon atoms, an aryl group having 1 to 20 carbon atoms, an alkoxide group having 1 to 20 carbon atoms, an aryloxide group having 1 to 20 carbon atoms, an alkyldiketonate group having 3 to 20 carbon atoms, an aryldiketonate group having 3 to 20 carbon atoms, a carboxylate group having 1 to 20 carbon atoms, an arylsulfonate group having 1 to 20 carbon atoms, an alkylsulfonate group having 1 to 20 carbon atoms, an alkylthio group having 1 to 20 carbon atoms, an alkylsulfonyl group having 1 to 20 carbon atoms, or an alkylsulfinyl group having 1 to 20 carbon atoms. In addition, each of $X^1$ and $X^2$ may also arbitrarily represent at least one group selected from an alkyl group having 1 to 10 carbon atoms, an alkoxy group having 1 to 10 carbon atoms and an aryl group, each of which has been further substituted with at least one atom or group selected from a halogen atom, an alkyl group having 1 to 5 carbon atoms, an alkoxy group having 1 to 5 carbon atoms and a phenyl group. More preferably, each of $X^1$ and $X^2$ represents a halogen atom, $CF_3CO_2$, $CH_3CO_3$, $CFH_2CO_2$, $(CH_3)_3CO$, $(CF_3)_2(CH_3)CO$, $(CF_3)(CH_3)_2CO$, PhO, MeO, EtO, tosylate, mesylate or trifluoromethanesulfonate. (Here, Me, Et and Ph individually represent a methyl group, an ethyl group and a phenyl group.) Most preferably, each of $X^1$ and $X^2$ represents a chlorine atom. Further, both $X^1$ and $X^2$ may be bidentate ligands.

Specific examples of the hydrolyzable organosilicon compound represented by the general formula (2) in which the silicon atoms are bonded together via the vinylene group (ethenylene group), include those expressed by the following structural formulae. Any one kind of these compounds may be used singularly, or, two or more kinds of them may be used in combination.

[Chemical formulae 8]

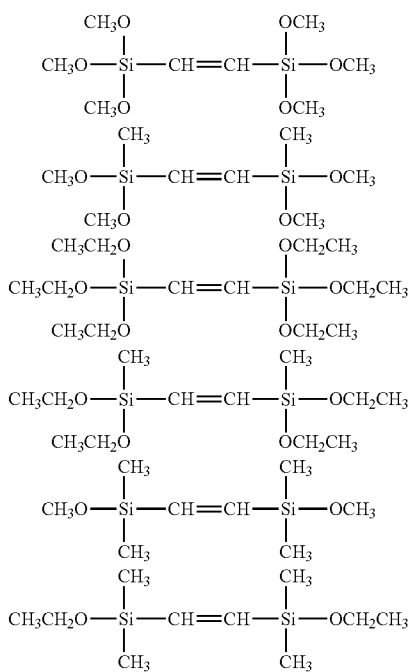

-continued

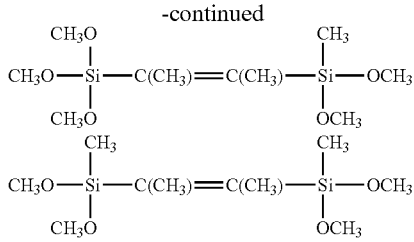

The hydrolyzable organosilicon compound as the component (B) is used in an amount of 0.1 to 30 parts by mass, preferably 1 to 25 parts by mass, more preferably 3 to 20 parts by mass, per 100 parts by mass of the organopolysiloxane as the component (A). When this amount is smaller than 0.1 parts by mass, there may arise a problem that an insufficient cross-linking will be resulted, which makes it impossible to obtain a composition having the intended fast curability. When this amount is larger than 30 parts by mass, there may arise a problem that the mechanical characteristics of a rubber physical property achieved will be impaired, which incurs an economic disadvantage.

—Component (C)—

A curing catalyst as a component (C) is used to promote a hydrolysis condensation reaction between the composition of the invention and water in the air, and is usually referred to as a curing catalyst. As such curing catalyst, there may be employed a known catalyst normally used in a room temperature-curable silicone resin composition that can be cured under moisture. However, excluded is an organotin compound having environmental safety problems.

Examples of the curing catalyst as the component (C) include, but are not limited to phosphazene-containing compounds such as N,N,N',N',N'',N''-hexamethyl-N'''-(trimethylsilylmethyl)-phosphorimidicamide; aminoalkyl group-substituted alkoxysilanes such as 3-aminopropyltriethoxysilane and N-β(aminoethyl)γ-aminopropyltrimethoxysilane; amine compounds such as hexyl amine and dodecylamine phosphate, or their salts; quaternary ammonium salts such as benzyltriethylammonium acetate; dialkylhydroxylamines such as dimethylhydroxylamine and diethylhydroxylamine; and guanidyl group-containing silanes or siloxanes such as tetramethylguanidylpropyltrimethoxysilane, tetramethylguanidylpropylmethyldimethoxysilane and tetramethylguanidylpropyltris(trimethylsiloxy)silane. Any one kind of such component (C) may be used singularly, or two or more kinds thereof may be mixed at the time of use.

The amount of these catalysts used is the so-called catalytic amount, and the component (C) is added in an amount of 0.001 to 20 parts by mass, preferably 0.005 to 10 parts by mass, more preferably 0.01 to 5 parts by mass, per 100 parts by mass of the organopolysiloxane as the component (A). When this amount is smaller than 0.001 parts by mass a favorable curability cannot be achieved, which incurs a failure of a slower curing rate. In contrast, when this amount is larger than 20 parts by mass, the composition will exhibit an extremely fast curability which may result in a shorter working time allowable after the composition has been applied, and impair the mechanical characteristics of the rubber obtained.

As optional components, at least one of the following components (D), (E) and (F) may be added to the composition of the present invention as appropriate.

—Component (D)—

A component (D) is an optional cross-linking agent component that can be added if necessary, and comprises a hydrolyzable organosilane and/or a partial hydrolysis condensate thereof other than the components (A) and (B) (i.e. a siloxane oligomer obtained by partially hydrolyzing a hydrolyzable organosilane other than the component (B), and having at least two, preferably at least three hydrolyzable groups remaining in one molecule). Specific examples of the component (D) include ethylsilicate, propylsilicate, ethyltrimethoxysilane, methyltriethoxysilane, vinyltrimethoxysilane, vinyltriethoxysilane, methyltris(methoxyethoxy)silane, vinyltris(methoxyethoxy)silane, methyltripropenoxysilane, vinyltripropenoxysilane, phenyltripropenoxysilane as well as partial hydrolysis condensates of these compounds. Any one of these examples may be used singularly, or two or more of them may be used in combination.

The component (D) is normally added in an amount of 0 to 30 parts by mass, preferably 0.1 to 20 parts by mass, more preferably 0.5 to 15 parts by mass, per 100 parts by mass of the component (A). When the amount of the component (D) added is greater than 30 parts by mass, there may arise a problem that the cured product become excessively hard, and that an economic disadvantage will be incurred thereby.

—Component (E)—

A component (E) is a filler (inorganic filler and/or organic resin filler), and is an optional component that can be added if necessary. The component (E) is used to impart a sufficient mechanical strength to the cured product formed of the composition of the invention. As this filler, a known filler can be used examples of which include reinforcing silica-based fillers such as a fine powder silica, a filmed silica (dry silica), a precipitated silica (wet silica), and a silica obtained by hydrophobizing the surface of any of these silicas with an organosilicon compound; glass beads; glass balloons; transparent resin beads; a silica aerogel; a diatom earth; metal oxides such as iron oxide, zinc oxide, titanium oxide and a fumed metal oxide; wet silicas or silicas obtained by surface-treating these wet silicas with a silane; reinforcing materials such as a quartz powder (crystalline silica fine powder), carbon black, talc, zeolite and bentonite; asbestos; a glass fiber; a carbon fiber; metal carbonates such as calcium carbonate, magnesium carbonate and zinc carbonate; asbestos; glass wool; a fine powder mica; and synthetic resin powders such as a molten silica powder, polystyrene, polyvinyl chloride and polypropylene. Among these fillers, inorganic fillers such as silica, calcium carbonate and zeolite are preferred; particularly preferred are a fumed silica whose surface has been hydrophobized, and calcium carbonate.

It is preferred that the component (E) be normally added in an amount of about 0 to 1,000 parts by mass, more preferably 0.5 to 600 parts by mass, and particularly preferably 5 to 300 parts by mass, per 100 parts by mass of the component (A). When such amount of the component (E) is larger than 1,000 parts by mass, not only an impaired workability will be exhibited as the viscosity of the composition increases, but it will also be difficult to achieve a rubber elasticity as the rubber strength decreases after curing.

—Component (F)—

A component (F) is an adhesion accelerator, and is an optional component that can be added if necessary. The component (F) is used to impart a sufficient adhesiveness to the cured product formed of the composition of the invention. As such adhesion accelerator (silane coupling agent such as a functional group-containing hydrolyzable silane), a known adhesion accelerator may be favorably used, examples of which include a vinylsilane coupling agent, a (meth)acrylsilane coupling agent, an epoxysilane coupling agent, an aminosilane coupling agent and a mercaptosilane coupling agent. Specific examples include vinyltris(β-methoxyethoxy)silane, γ-methacryloxypropyltrimethoxysilane, β-(3,4-epoxycyclohexyl) ethyltrimethoxysilane, γ-glycidoxypropyltrimethoxysilane, γ-glycidoxypropylmethyldiethoxysilane N-β-(aminoethyl) γ-aminopropyltrimethoxysilane, γ-aminopropyltriethoxysilane, 3-2-(aminoethylamino)propyltrimethoxysilane, γ-mercaptopropyltrimethosilane and isocyanate silane.

Among the above examples, particularly preferred are aminosilanes such as γ-aminopropyltriethoxysilane and 3-2-(aminoethylamino)propyltrimethoxysilane; epoxysilanes such as γ-glycidoxypropyltrimethoxysilane, β-(3,4-epoxycyclohexyl) ethyltrimethoxysilane; and isocyanate silane.

It is preferred that the component (F) be added in an amount of about 0 to 30 parts by mass, more preferably 0.1 to 20 parts by mass, and particularly preferably 0.3 to 15 parts by mass, per 100 parts by mass of the component (A). The component (F) does not have to be used if adhesion can already take place by the filler and an adherend without the aid of an adhesion accelerator.

—Component (G)—

A component (G) is a bleed oil, and is an essential component in the composition of the present invention. There are no particular restrictions the bleed as the component (G), provided that this bleed oil is especially a silicone oil whose non-reactive (non-condensation reactive) main chain that does not undergo a condensation reaction with the diorganopolysiloxane as the component (A) has a siloxane skeleton (e.g. a linear diorganopolysiloxane having a main chain composed of repeating diorganosiloxane units, and having both molecular chain ends blocked by a triorganosiloxy group such as a trimethylsiloxy group), and that such silicone oil is not associated with the curing (cross-linking) reaction of the composition and bleeds from inside the cured product.

Examples of this silicone oil include: a dimethyl silicone oil in which all the monovalent organic groups (organo groups) bonded to the silicon atoms in the diorganosiloxane units composing the main chain are methyl groups; a methylphenyl silicone oil obtained by substituting a part of the methyl groups in such dimethyl silicone oil with phenyl groups; an amino-modified silicone oil obtained by substituting a part of the methyl groups in the aforesaid dimethyl silicone oil with monoamine groups, diamine groups or amino-polyether groups; an epoxy-modified silicone oil obtained by substituting a part of the methyl groups in the aforesaid dimethyl silicone oil with epoxy groups, alicyclic epoxy groups, epoxy-polyether groups or epoxy-aralkyl groups; a carbinol-modified silicone oil obtained by substituting a part of the methyl groups in the aforesaid dimethyl silicone oil with carbinol groups; a mercapto-modified silicone oil obtained by substituting a part of the methyl groups in the aforesaid dimethyl silicone oil with mercapto groups; a carboxyl-modified silicone oil obtained by substituting a part of the methyl groups in the aforesaid dimethyl silicone oil with carboxyl groups; a methacryl-modified silicone oil obtained by substituting a part of the methyl groups in the aforesaid dimethyl silicone oil with methacryl groups; a polyether-modified silicone oil obtained by substituting a part of the methyl groups in the aforesaid dimethyl silicone oil, with polyether groups or polyether-long chain ($C_{6-18}$) alkyl-aralkyl groups; a long chain ($C_{6-18}$) alkyl-modified silicone oil obtained by substituting a part of the methyl groups in the aforesaid dimethyl silicone oil with long chain ($C_{6-18}$) alkyl groups or long chain ($C_{6-18}$) allyl-aralkyl groups; a higher fatty acid-modified silicone oil obtained by substituting a part of the methyl groups in the aforesaid dimethyl silicone oil with higher fatty acid ester groups; and a fluoroalkyl-modified silicone oil obtained by substituting a part of the methyl groups in the aforesaid dimethyl silicone oil with fluoroalkyl groups. Among these examples, the methylphenyl silicone oil, the polyether-modified silicone oil and the long chain ($C_{6-18}$) alkyl-modified silicone oil are preferred.

When measured by gel permeation chromatography (GPC), it is preferred that a number average molecular weight of the component (G) in terms of polystyrene be 250 to 100,000, more preferably 1,000 to 60,000. When this number average molecular weight is smaller than 250, a poor antifouling property may be exhibited; when this number average molecular weight is larger than 100,000, the viscosity of the composition may become excessively high in way such that it may be difficult to handle such composition.

Further, it is preferred that the viscosity of the component (G) at 25° C. be 20 to 30,000 mPa·s, more preferably 50 to 10,000 mPa·s. When this viscosity at 25° C. is lower than 20 mPa·s, a poor antifouling property may be exhibited; when this viscosity at 25° C. is higher than 30,000 mPa·s, the viscosity of the composition may become excessively high in way such that it may be difficult to handle such composition.

In the present invention, it is desired that one or more kinds of the component (G) be contained in an amount of about 0.01 to 100 parts by mass in total, preferably 0.1 to 80 parts by mass, more preferably 1 to 60 parts by mass, and even more preferably 5 to 50 parts by mass, per 100 parts by mass of the component (A). When the amount of such silicone oil(s) is within the above ranges, for example, a (antifouling) coating film superior in both antifouling property and coating film strength tends to be achieved if using the composition as an antifouling paint. However, the antifouling property may be impaired if the amount of the silicone oil(s) is lower than the above ranges; and the coating film strength may decrease if the amount of the silicone oil(s) is greater than the above ranges.

—Other Components—

As an additive agent(s), there can be further added to the room temperature-curable organopolysiloxane composition of the invention known additive agents including, for example, a pigment; a dye; an anti-aging agent; an antioxidant; an antistatic agent; and flame retardants such as antimony oxide and chlorinated paraffin. Moreover, there may also be added polyether as a thixotropy improving agent, a fungicide and/or an antimicrobial agent. In addition, in order to improve curability, there may be added a metal-containing curing catalyst other than a tin compound.

Examples of the metal-containing curing catalyst other than a tin compound include titanic acid esters or titanium chelate compounds, such as tetraisopropoxy titanium, tetra n-butoxy titanium, tetrakis(2-ethylhexoxy)titanium, dipropoxybis(acetylacetonato)titanium and titanium isopropoxyoctylene glycol; zinc naphthenate; zinc stearate; zinc-2-ethyloctoate; iron-2-ethylhexoate; cobalt-2-ethylhexoate; manganese-2-ethylhexoate; cobalt naphthenate; aluminum chelate compounds such as alcoholate aluminum compounds, aluminum alkylacetate-diisopropylate and aluminumbisethylacetoacetate-monoacetylacetonate, examples of the alcoholate aluminum compounds being aluminum isopropylate and aluminum secondary butylate; organic metal compounds such as bismuth neodecanoate (III), 2-ethylhexanoate bismuth (III), bismuth citrate (III) and bismuth octylate; and lower fatty acid salts of alkali metals, such as potassium acetate, sodium acetate and lithium oxalate. However, the curing catalyst(s) as the other components are not limited to these examples. Any one kind of the curing catalysts as the other components may be used singularly, or two or more kinds of them may be mixed at the time of use.

If the above curing catalyst is used, there are no particular restrictions on the amount thereof, and an effective amount as catalyst will suffice. However, it is preferred that such curing catalyst be normally used in an amount of 0.01 to 20 parts by mass, particularly preferably 0.1 to 10 parts by mass, per 100 parts by mass of the component (A). In the case where this catalyst is employed, if the amount of the catalyst contained is smaller than the lower limits of the above ranges, the composition obtained may exhibit an insufficient curability depending on the type of a crosslinking agent; whereas if the amount of the catalyst contained is larger than the upper limits of the above ranges, the composition obtained may exhibit an impaired storage stability.

Production of Room Temperature-Curable Organopolysiloxane Composition

The room temperature-curable organopolysiloxane composition of the present invention can, for example, be produced by mixing the above components under a normal or reduced pressure, preferably a reduced pressure of 0.09 to 0.01 MPa, and under a non-heated condition, preferably at a temperature of not higher than 60° C., for about 30 min to 3 hours in general. Further, the components (A) and (E) may be mixed in advance under a reduced pressure and a heated condition, preferably at 80 to 160° C. for about 30 min to 3 hours, followed by adding the rest of the components thereto and then performing mixing under a normal or reduced pressure, preferably a reduced pressure of 0.09 to 0.01 MPa, and under a non-heated condition, preferably at a temperature of not higher than 60° C., for about 30 min to 3 hours in general. In this way, there can be achieved a more excellent surface smoothness of a cured coating film, and a more excellent viscosity stability over time.

When the room temperature-curable organopolysiloxane composition of the invention is used as, for example a coating material, a paint, and particularly an antifouling paint, an excellent stability at the time of preparation, storage and preservation will be achieved, a favorable curability will be exhibited, and a coating film obtained will be equally superior in rubber properties such as hardness, tensile strength and elongation, and also superior in, for example, antifouling property. For these reasons, the composition of the invention can be especially favorably used to form an antifouling coating film.

Here, it is preferred that the viscosity of the room temperature-curable organopolysiloxane composition of the invention at 23° C. be 500 to 200,000 mPa·s, particularly preferably 1,000 to 150,000 mPa·s, which is a viscosity especially suitable for coating.

The room temperature-curable organopolysiloxane composition of the invention is highly suitable for use in, for example, coating materials requiring a water resistance, such as a ship bottom paint, a paint for seawater pipes at power plants and a paint for fish net; moistureproof coating materials requiring a moisture resistance, such as LCD and PDP; and adhesive seals such as an adhesive seal used between electric wires and resin coating, an adhesive seal used between electric wires and a resin case or connector, and an adhesive seal for compression or decompression chambers.

Especially, the composition of the invention can be applied to underwater structures such as vessels, harbor facilities, buoys, pipelines, bridges, undersea bases, offshore oil drilling facilities, water pipes at power plants, culturing nets and fixed nets. The cured coating film of this composition is not toxic, does not have any environmental problems thereby; and can also prevent the adhesion/growth of aquatic organisms over a long period of time, thus bringing about a superior antifouling property.

There are no particular restrictions on the amount of the room temperature-curable organopolysiloxane composition of the invention to be applied to an underwater structure. However, it is preferred that the coating amount be such that the film thickness after curing will become 10 to 1,000 μm, particularly 50 to 500 μm. Here, the room temperature-curable organopolysiloxane composition obtained by the production method of the invention can be applied and cured at room temperature (ordinary temperature).

WORKING EXAMPLE

The present invention is described in great detail hereunder with reference to synthesis, working and comparative examples. However, the invention is not limited to these working examples. In the following specific examples. "part" refers to "part by mass," and viscosity refers to a value measured by a rotary viscometer at 25° C.

SYNTHESIS EXAMPLE

Below is a method for synthesizing the component (B) which is the hydrolyzable organosilicon compound having the carbon-carbon double bond between the two silicon atoms.

Synthesis Example 1

Synthesis of a Hydrolyzable Organosilicon Compound with Two Trialkoxysilyl Groups Bonded Together by an Ethenylene Group -[bis(trimethoxysilyl)ethylene]

Under an argon atmosphere and at a temperature of 25° C. 50 g of vinyltrimethoxysilane (0337 mol) and 0.2 g of the second-generation Grubbs catalyst (0.235 mmol) were put into toluene, and stirred together at 120° C. for 8 hours. After the reaction was completed the reaction solution was analyzed via gas chromatography to confirm that bis(trimethoxysilyl)ethylene(bis(trimethoxysilyl)ethene) had been obtained in an yield of 85%. This reaction is shown in the following formula (7).

[Chemical formula 9]

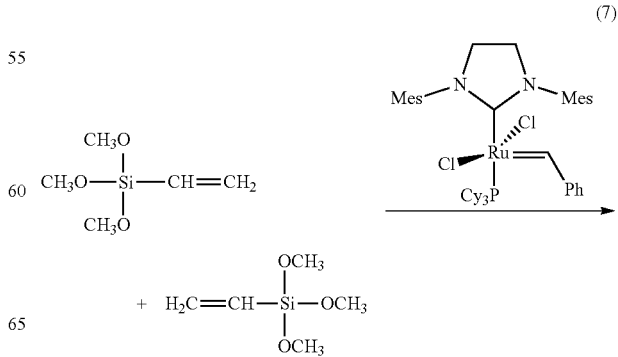

-continued

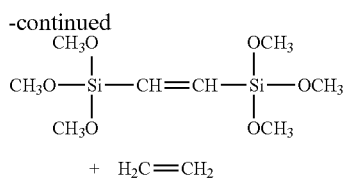

+ H₂C=CH₂

Synthesis Example 2

Similar reaction and handling was performed as is the case in the synthesis example 1, except that vinyltriethoxysilane was used instead of vinyltrimethoxysilane. As a result, bis(triethoxysilyl)ethylene(bis(triethoxysilyl)ethene) was obtained in an yield of 90%.

Synthesis Example 3

Similar reaction and handling was performed as is the case in the synthesis example 1, except that vinylmethyldimethoxysilane was used instead of vinyltrimethoxysilane. As a result, bis(methyldimethoxysilyl)ethylene(bis(methyldimethoxysilyl)ethene) was obtained in an yield of 85%.

Synthesis Example 4

Similar reaction and handling was performed as is the case in the synthesis example 1, except that vinylmethyldiethoxysilane was used instead of vinyltrimethoxysilane. As a result, bis(methyldiethoxysilyl)ethylene(bis(methyldiethoxysilyl)ethene) was obtained in an yield of 90%.

Working Example 1

Homogenously mixed together were 50 parts of α, ω-dihydroxy-dimethylpolysiloxane (dimethylpolysiloxane with both molecular chain ends blocked by a hydroxydimethylsiloxy group) having a viscosity of 1,500 mPa·s; 50 parts of α, ω-dihydroxy-dimethylpolysiloxane having a viscosity of 5,000 mPa·s; and 10 parts of a fumed silica that had been surface-treated with dimethyldichlorosilane and had a BET specific surface area of 120 m²/g. The mixing was performed at 30 to 40° C. under ordinary pressure for an hour.

Further, added thereto were 5.0 parts of the bis(trimethoxysilyl)ethylene obtained in the synthesis example 1, 0.5 parts of tetramethylguanidylpropyltrimethoxysilane and 1.0 part of 3-aminopropylmethoxysilane, followed by performing mixing at 30 to 40° C. under a reduced pressure of 0.04 to 0.06 MPa until homogenously mixed. Furthermore, 30 parts of α, ω-trimethylsiloxy-dimethyldiphenylpolysilaxane (dimethylsiloxane-diphenylsiloxane copolymer with both molecular chain ends blocked by a trimethylsiloxy group) having a viscosity of 300 mPa·s were added thereto, followed by performing mixing at 30 to 40° C. under a reduced pressure of 0.04 to 0.06 MPa until homogenously mixed, thereby obtaining a composition.

Working Example 2

A composition was obtained in a similar manner as the working example 1, except that 6.0 parts of the bis(triethoxysilyl)ethylene obtained in the synthesis example 2 were used instead of the bis(trimethoxysilyl)ethylene used in the working example 1.

Working Example 3

A composition was obtained in a similar manner as the working example 1, except that 5.0 parts of the bis(methyldimethoxysilyl)ethylene obtained in the synthesis example 3 were used instead of the bis(trimethoxysilyl)ethylene used in the working example 1.

Working Example 4

A composition was obtained in a similar manner as the working example 1, except that 6.0 parts of the bis(methyldiethoxysilyl)ethylene obtained in the synthesis example 4 were used instead of the bis(trimethoxysilyl)ethylene used in the working example 1.

Working Example 5

A composition was obtained in a similar manner as the working example 1, except that the 30 parts of the α, ω-trimethylsiloxy-dimethyldiphenylpolysiloxane used in the working example 1 and having the viscosity of 300 mPa·s were changed to 30 parts of α, ω-trimethylsiloxy-dimethyl-methyl(polyether)polysiloxane (dimethylsiloxane-methyl(polyether)siloxane copolymer with both molecular chain ends blocked by a trimethylsiloxy group) (HLB 4) having a viscosity of 180 mPa·s.

Working Example 6

Homogenously mixed together were 50 parts of α, ω-dihydroxy-dimethylpolysiloxane having a viscosity of 1,500 mPa·s; 50 parts of α, ω-dihydroxy-dimethylpolysiloxane having a viscosity of 5,000 mPa·s; and 10 parts of a fumed silica having a BET specific surface area of 130 m²/g. The mixing was performed at 110 to 120° C. under a reduced pressure of 0.04 to 0.06 MPa for two hours. After being cooled to 60° C. or lower, there were further added thereto 5.0 parts of the bis(trimethoxysilyl)ethylene obtained in the synthesis example 1; 0.5 parts of tetramethylguanidylpropyltrimethoxysilane; and 0.5 parts of 3-aminopropyltriethoxysilane, followed by performing mixing at 30 to 40° C. under a reduced pressure of 0.04 to 0.06 MPa until homogenously mixed. Furthermore, 30 parts of α, ω-trimethylsiloxy-dimethyldiphenylpolysiloxane having a viscosity of 300 mPa·s were, added thereto, followed by performing mixing at 30 to 40° C. under a reduced pressure of 0.04 to 0.06 MPa until homogenously mixed, thereby obtaining a composition.

Working Example 7

A composition was obtained in a similar manner as the working example 6, except that 6.0 parts of the bis(triethoxysilyl)ethylene obtained in the synthesis example 2 were used instead of the bis(trimethoxysilyl)ethylene used in the working example 6.

Comparative Example 1

A composition was obtained in a similar manner as the working example 1, except that the 30 parts of the α, ω-trimethylsiloxy-dimethyldiphenylpolysiloxane used in the working example 1 and having the viscosity of 300 mPa·s were excluded from the composition.

Comparative Example 2

A composition was obtained in a similar manner as the working example 1, except that 5.0 parts of a bis(trimethoxysilyl)ethane [represented by the following structural formula (8)] were used instead of the bis(trimethoxysilyl)ethylene used in the working example 1.

[Chemical formula 10]

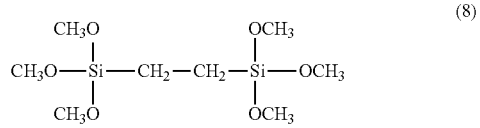
(8)

Comparative Example 3

A composition was obtained in a similar manner as the working example 1, except that 6.0 parts of a bis(triethoxysilyl)ethane [represented by the following structural formula (9)] were used instead of the bis(trimethoxysilyl)ethylene used in the working example 1.

[Chemical formula 11]

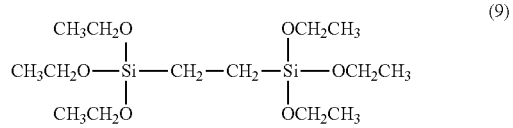
(9)

Comparative Example 4

A composition was obtained in a similar manner as the working example 1, except that 4.0 parts of trimethoxysilane were used instead of the bis(trimethoxysilyl)ethylene used in the working example 1.

Performance Test

With regard to the compositions obtained in the above examples, various performance tests were conducted by the following testing methods.

Testing Methods (A) Property before curing: Tack-free time was measured in accordance with JIS A1439.

(B) Property after curing: A sheet having a thickness of 2 mm was formed, followed by curing the same at 23° C./50% RH for seven days, and then measuring the rubber properties thereof (hardness, elongation, tensile strength) in accordance with JIS K6249.

(C) Coating workability: A test sample was prepared by mixing 90 g of a sample (composition) and 10 g of xylene. A soft steel plate having a size of 100 mm×100 mm×1 mm (thickness) was attached to the center of a tinned plate having a size of 1,000 mm×1,000 mm×1 mm (thickness), followed by performing airless spray coating with the tinned plate being erected in a perpendicular manner. After the coating film had dried, there was confirmed (visually) whether clogging had occurred in an instrument used at the time of performing spraying (spray property), and a limit film thickness at which film sagging occurred was measured.

(D) Antifouling property: A plate previously coated with an epoxy-based anticorrosion paint (film thickness 200 μm) was further coated to obtain a test coated plate in way such that a film formed thereon would have a thickness of 300 μm when cured. The test coated plate thus prepared was cured at 23° C./50% RH for seven days. The test coated plate cured was then subjected to a suspension test at a depth of 1.5 m off a beach in the Kanagawa prefecture for 24 months. The state of adhesion of shellfishes such as barnacles; and seaweeds was checked when each of 3, 6, 12 and 24 months had passed.

(E) Paint stability: Tests were performed on a paint condition (stability) and coating workability of a paint that had been kept in a sealed condition at 30° C. for six months after its preparation. The paint condition (stability) was inspected visually, and by means of a grind gauge after stirring the paint unsealed. The coating workability was evaluated in a similar manner as above.

The results of these tests are shown in Tables 1 and 2.

TABLE 1

| | | Working example 1 | Working example 2 | Working example 3 | Working example 4 | Working example 5 | Working example 6 | Working example 7 |
|---|---|---|---|---|---|---|---|---|
| Property before curing | Tack-free (min) | 20 | 30 | 25 | 40 | 20 | 25 | 35 |
| Property after curing | Hardness Type-A | 24 | 22 | 20 | 18 | 24 | 23 | 20 |
| | Elongation (%) | 180 | 210 | 250 | 280 | 200 | 200 | 210 |
| | Tensile strength (MPa) | 1.0 | 1.1 | 1.2 | 1.1 | 1.1 | 1.1 | 1.0 |
| Coating workability | Spray property | Favorable | Favorable | Favorable | Favorable | Favorable | Favorable | Favorable |
| | limit film thickness (μm) | 150 | 150 | 150 | 150 | 150 | 100 | 100 |
| Antifouling property | 3 months | No adhesion at all | No adhesion at all | No adhesion at all | No adhesion at all | No adhesion at all | No adhesion at all | No adhesion at all |
| | 6 months | No adhesion at all | No adhesion at all | No adhesion at all | No adhesion at all | No adhesion at all | No adhesion at all | No adhesion at all |
| | 12 months | Slightly adhered | Slightly adhered | Slightly adhered | Slightly adhered | Slightly adhered | No adhesion at all | No adhesion at all |
| | 24 months | Slightly adhered | Slightly adhered | Slightly adhered | Slightly adhered | Slightly adhered | No adhesion at all | No adhesion at all |

TABLE 1-continued

|  |  | Working example 1 | Working example 2 | Working example 3 | Working example 4 | Working example 5 | Working example 6 | Working example 7 |
|---|---|---|---|---|---|---|---|---|
| Paint stability | Paint condition | Favorable | Favorable | Favorable | Favorable | Favorable | Favorable | Favorable |
|  | Spray property | Favorable | Favorable | Favorable | Favorable | Favorable | Favorable | Favorable |
|  | limit film thickness (μm) | 150 | 150 | 150 | 150 | 150 | 100 | 100 |

TABLE 2

|  |  | Comparative example 1 | Comparative example 2 | Comparative example 3 | Comparative example 4 |
|---|---|---|---|---|---|
| Property before curing | Tack-free (min) | 20 | 60 | 60 or more | 60 or more |
| Property after curing | Hardness Type-A | 35 | 23 | 21 | 23 |
|  | Elongation (%) | 160 | 200 | 240 | 180 |
|  | Tensile strength (MPa) | 1.3 | 1.0 | 0.9 | 1.0 |
| Coating workability | Spray property limit film thickness (μm) | Favorable 200 | Favorable 150 | Favorable 150 | Favorable 150 |
| Antifouling property | 3 months | Adhesion in large quantity | No adhesion at all | No adhesion at all | No adhesion at all |
|  | 6 months | Adhesion in large quantity | slightly adhered | Slightly adhered | Slightly adhered |
|  | 12 months | Adhesion in large quantity | Adhesion in large quantity | Adhesion in large quantity | Adhesion in large quantity |
|  | 24 months | Adhesion in large quantity | Adhesion in large quantity | Adhesion in large quantity | Adhesion in large quantity |
| Paint stability | Paint condition | Favorable | Unfavorable | Unfavorable | Unfavorable |
|  | Spray property limit film thickness (μm) | Favorable 200 | Unfavorable Unmeasurable | Unfavorable Unmeasurable | Unfavorable Unmeasurable |

INDUSTRIAL APPLICABILITY

The composition of the present invention is a composition free of organotin, with a high regard for environmental issues. Further, since the composition of the invention is superior in curability, and the coating film formed therefrom has the coating film strength, coating film hardness, rubber properties, water resistance and moisture resistance, the composition is highly suitable for use in, for example, coating materials requiring a water resistance, such as a ship bottom paint, a paint for seawater pipes at power plants and a paint for fish net; moistureproof coating materials requiring a moisture resistance, such as LCD and PDP; and adhesive seals such as an adhesive seal used between electric wires and resin coating, an adhesive seal used between electric wires and a resin case or connector, and an adhesive seal for compression or decompression chambers. Particularly, if used in, for example, a ship bottom paint, a paint for seawater pipes at power plants and a paint for fish net, aquatic organisms can be prevented from adhering to the surfaces thereof and growing thereon.

The invention claimed is:
1. A room temperature-curable organopolysiloxane composition comprising:
 (A) 100 parts by mass of an organopolysiloxane represented by the following general formula (1)

[Chemical formula 1]

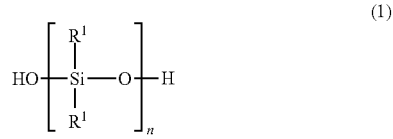

(1)

wherein $R^1$ represents either a hydrogen atom or a monovalent hydrocarbon group that may have a substituent group and has 1 to 20 carbon atoms, $R^1$s may be identical to or different from one another, and n represents an integer of not smaller than 1;
 (B) 0.1 to 30 parts by mass of a hydrolyzable organosilicon compound and/or a partial hydrolysis condensate thereof, represented by the following general formula (2)

[Chemical formula 2]

(2)

wherein $R^1$ represents either a hydrogen atom or a monovalent hydrocarbon group that may have a substituent group and has 1 to 20 carbon atoms, $R^1$s may be identical to or different from one another, $R^2$ represents either an alkyl group that may have a substituent group and has 1 to 20 carbon atoms or a cycloalkyl group that may have a substituent group and has 3 to 20 carbon atoms, and a represents an integer of 1 to 3;

(C) 0.001 to 20 parts by mass of a curing catalyst; and (G) 0.01 to 100 parts by mass of a bleed oil.

2. The room temperature-curable organopolysiloxane composition according to claim 1, further comprising at least one of (D) 0.1 to 30 parts by mass of a hydrolyzable organosilane and/or a partial hydrolysis condensate thereof other than the components (A) and (B);

(E) 0.5 to 1,000 parts by mass of a filler; and (F) 0.1 to 30 parts by mass of an adhesion accelerator.

3. A base member coated with a cured product of the room temperature-curable organopolysiloxane composition as set forth in claim 1.

4. The base member according to claim 3, wherein the base member is an underwater structure.

5. A base member coated with a cured product of the room temperature-curable organopolysiloxane composition as set forth in claim 2.

6. The base member according to claim 5, wherein the base member is an underwater structure.

* * * * *